(12) United States Patent
Frank et al.

(10) Patent No.: US 7,367,808 B1
(45) Date of Patent: May 6, 2008

(54) EMPLOYEE RETENTION SYSTEM AND ASSOCIATED METHODS

(75) Inventors: Fredric D. Frank, Longwood, FL (US); Richard P. Finnegan, Orlando, FL (US); Christopher P. Mulligan, Altamonte Springs, FL (US)

(73) Assignee: TalentKeepers, Inc., Maitland, FL (US)

( * ) Notice: Subject to any disclaimer, the term of this patent is extended or adjusted under 35 U.S.C. 154(b) by 745 days.

(21) Appl. No.: 10/414,592

(22) Filed: Apr. 16, 2003

Related U.S. Application Data

(60) Provisional application No. 60/409,429, filed on Sep. 10, 2002.

(51) Int. Cl.
*G09B 19/00* (2006.01)

(52) U.S. Cl. .............................. 434/219; 705/1; 705/7; 705/11

(58) Field of Classification Search ................ 434/219, 434/323; 705/11, 1, 7
See application file for complete search history.

(56) References Cited

U.S. PATENT DOCUMENTS

| | | | |
|---|---|---|---|
| 4,671,772 A * | 6/1987 | Slade et al. ................ | 434/219 |
| 5,743,742 A * | 4/1998 | Morrel-Samuels .......... | 434/236 |
| 5,795,155 A * | 8/1998 | Morrel-Samuels .......... | 434/107 |
| 5,813,863 A | 9/1998 | Sloane et al. | |
| 5,879,163 A | 3/1999 | Brown et al. | |
| 6,007,340 A | 12/1999 | Morrel-Samuels | |
| 6,039,575 A * | 3/2000 | L'Allier et al. ............. | 434/323 |
| 6,039,688 A | 3/2000 | Douglas et al. | |
| 6,159,015 A | 12/2000 | Buffington et al. | |
| 6,213,780 B1 * | 4/2001 | Ho et al. ..................... | 434/219 |
| 6,275,812 B1 | 8/2001 | Haq et al. | |
| 6,546,230 B1 * | 4/2003 | Allison ....................... | 434/350 |
| 6,944,596 B1 * | 9/2005 | Gray et al. .................... | 705/1 |

(Continued)

OTHER PUBLICATIONS

Denison, Daniel R. Denison Consulting—Leadership Development Surveys [online] retrieved on Jul. 10, 2003]. Retrieved from the Internet:<URL:http://www.denisonculture.com/leadership/lead_main.html>.*

(Continued)

*Primary Examiner*—Xuan M. Thai
*Assistant Examiner*—Meagan Thomasson
(74) *Attorney, Agent, or Firm*—Allen, Dyer, Doppelt, Milbrath & Gilchrist, P.A.

(57) ABSTRACT

A modularized system and method for interactively diagnosing and addressing workplace issues that can lead to employee turnover includes computer-delivered assessment and training modules, each directed to a particular aspect of improving employee retention by focusing on retention competencies. Some modules are intended for employee use; others, for supervisors. The employee sector modules are primarily administered for the purpose of data collection, the resulting data utilized to prescribe assessment and training modules to the supervisor. The supervisor sector modules include an assessment adapted to create an individualized learning plan, wherein questions assess understanding of the topic, and then a job simulation is presented, guiding the user through a simulation applying the concepts from the lesson, followed by a mastery assessment. After passing the mastery assessment, the user can view and print learning activities and key learning points for each program.

34 Claims, 11 Drawing Sheets

U.S. PATENT DOCUMENTS

| | | | | |
|---|---|---|---|---|
| 6,944,624 | B2* | 9/2005 | Orton et al. | 707/102 |
| 2001/0036619 | A1* | 11/2001 | Kerwin | 434/118 |
| 2002/0042786 | A1* | 4/2002 | Scarborough et al. | 706/21 |
| 2002/0112011 | A1 | 8/2002 | Washington | |
| 2002/0198748 | A1* | 12/2002 | Eden et al. | 705/7 |
| 2003/0101091 | A1* | 5/2003 | Levin et al. | 705/11 |

OTHER PUBLICATIONS

Gupta, Uma G. and Dan Braunstein. "Techincal Wizards, Lousy Managers: Avoiding Disasters in Promoting and Hiring IT Management", Winter 2001, Information Strategy: The Executive's Journal, pp. 16-21.*

"15 Leadership Qualities", Education World. 2000. http://www.educationworld.com/a_admin/TM/WS_leadership_qualities.shtml.*

Jenkins, Linda. "Top Employers Train to Retain", Vault People Management Career Information. Copyright 2000. Obtained from http://www.vault.com/nr/newsmain on Sep. 26, 2007.*

Dr. Sullivan, John. "Post-Exit Interviews". Copyright 1997. Obtained from http://ourworld.compuserve.com/homepages/gately/pp15js16.htm on Sep. 26, 2007.*

Smith, Gregory P. "Transform Your Organization from High Turnover to High Retention", Copyright 1999. Obtained from http://www.businessknowhow.com/manage/retain-employees.htm on Sep. 26, 2007.*

Chart Your Course International, "Employee Retention Survey", Published 2001. Obtained from http://www.highretention.com/Retention%20Survey.html on Sep. 26, 2007.*

* cited by examiner

Results Summary

| RQ: 4 (Acceptable) | TalentScope Performance | Insight Performance Level | | | | | |
|---|---|---|---|---|---|---|---|
| | | Very Strongly Disagree | | | | | Very Strongly Agree |
| | | 1 | 2 | 3 | 4 | 5 | 6 |
| Retention Expert<br>Self: 6, Manager: N/A, Peers: 5.5, M<br>Team: 5.3 | | | | | | T P | S |
| Trust Builder<br>Self: 6, Manager: N/A, Peers: 5.5, M<br>Team: 5.7 | | | | | | P T | S |
| Retention Monitor<br>Self: 4, Manager: N/A, Peers: 5, NI<br>Team: 5 | | | | S | | | |
| Climate Builder<br>Self: 4, Manager: N/A, Peers: 5, M<br>Team: 4.9 | | | | S | T P | | |
| Talent Developer and Coach<br>Self: 4, Manager: N/A, Peers: 5, M<br>Team: 5.6 | | | | S | | P T | |
| Flexibility Expert<br>Self: 5, Manager: N/A, Peers: 5, NI<br>Team: 5.3 | | | | | | T | |
| Communicator<br>Self: 5, Manager: N/A, Peers: 5.5, M<br>Team: 5.3 | | | | | | S T P | |
| Esteem Builder<br>Self: 6, Manager: N/A, Peers: 5, M<br>Team: 5.4 | | | | | | P T | S |
| High Performance Builder<br>Self: 5, Manager: N/A, Peers: 5, M<br>Team: 5.2 | | | | | | T | |
| Talent Finder<br>Self: 4, Manager: N/A, Peers: 3, M<br>Team: 3.8 | | | | P T S | | | |

Key:
TalentScope Performance: E = Excellent, M = Moderate, NI = Needs Improvement
Your Average Rating by Others — Peers: [P] Team: [T] Mgrs: [S] Tie: [ ]
Your Self Rating [S]

FIG. 3

EMPLOYEE RETENTION SYSTEM AND ASSOCIATED METHODS

CROSS-REFERENCE TO RELATED APPLICATION

This application claims priority to provisional application Ser. No. 60/409,429, "Employee Retention System and Associated Methods," filed on Sep. 10, 2002.

BACKGROUND OF THE INVENTION

1. Field of the Invention

The present invention relates to systems and methods for human resources management, and, more particularly, to such systems and methods for improving retention of employees.

2. Description of Related Art

Employee turnover is a persistent problem in the business arena. Not only does turnover affect workplace morale, but the expense of replacing employees can be very high depending upon expertise.

Studies have shown that a major contributing factor to employee turnover is lack of effectiveness at the supervisor level. A method and system for measuring leadership effectiveness has been disclosed by Morrel-Samuels (U.S. Pat. No. 6,007,340).

SUMMARY OF THE INVENTION

The present invention is directed to a coordinated, modularized system and method for interactively diagnosing and addressing workplace issues that can lead to employee turnover. The system comprises a plurality of computer-delivered assessment and training modules, each directed to a particular aspect of improving employee retention. Some of the modules are intended for use by employees ("team members"); others, by supervisors. The employee sector comprises modules primarily administered for the purpose of data collection, the resulting data then utilized to prescribe assessment and training modules to the respective supervisor for training him/her in retention competencies and to then change behavior.

The supervisor sector also comprises a plurality of modules, including at least one assessment module and at least one training module based upon retention-specific behavioral competencies. Each learning program comprises two lessons, each divided into several learning topics. At different points in the lesson, the user responds to questions, called "progress checks," to assess his/her understanding of the topic. Once all the progress checks are completed, the supervisor is presented with a job simulation, which guides the user through a simulation applying the concepts from the lesson. The user also responds to questions on the simulation. Once all the progress checks and job simulations are complete, the user is presented with a mastery assessment. After passing the mastery assessment, the user can view and print and conduct off-line learning activities and the key learning points for each program.

The programs offer the user a plurality of routes through the material:

1. A teaching route includes full instruction with test, audio, and graphics, progress checks, job simulations, and mastery assessment.

2. A guiding route includes a summary of each learning topic, with progress checks administered to check understanding before the user advances, job simulations, and mastery assessment.

3. An accelerated route takes the user directly to the progress checks, job simulations, and mastery assessment.

Another feature of the present invention comprises ongoing support provided over a network such as the Internet, wherein ideas and recommended practices are shared.

In a particular embodiment in which the modules are administered from a central site, the system is managed by a management system resident at the central site, which is adapted to provide reports and tracking data as desired.

The system and method of the present invention permit a cost-effective solution to the problem of employee turnover. The cost of real-time consultants is eliminated, and the employees and supervisors can access modules of the system at their convenience, in a private, nonthreatening atmosphere that is objective, easily accessible, and personalized.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 3 is a graph illustrating a summary of results for each competency, combined across two instruments.

DETAILED DESCRIPTION OF THE PREFERRED EMBODIMENTS

Figure 1:
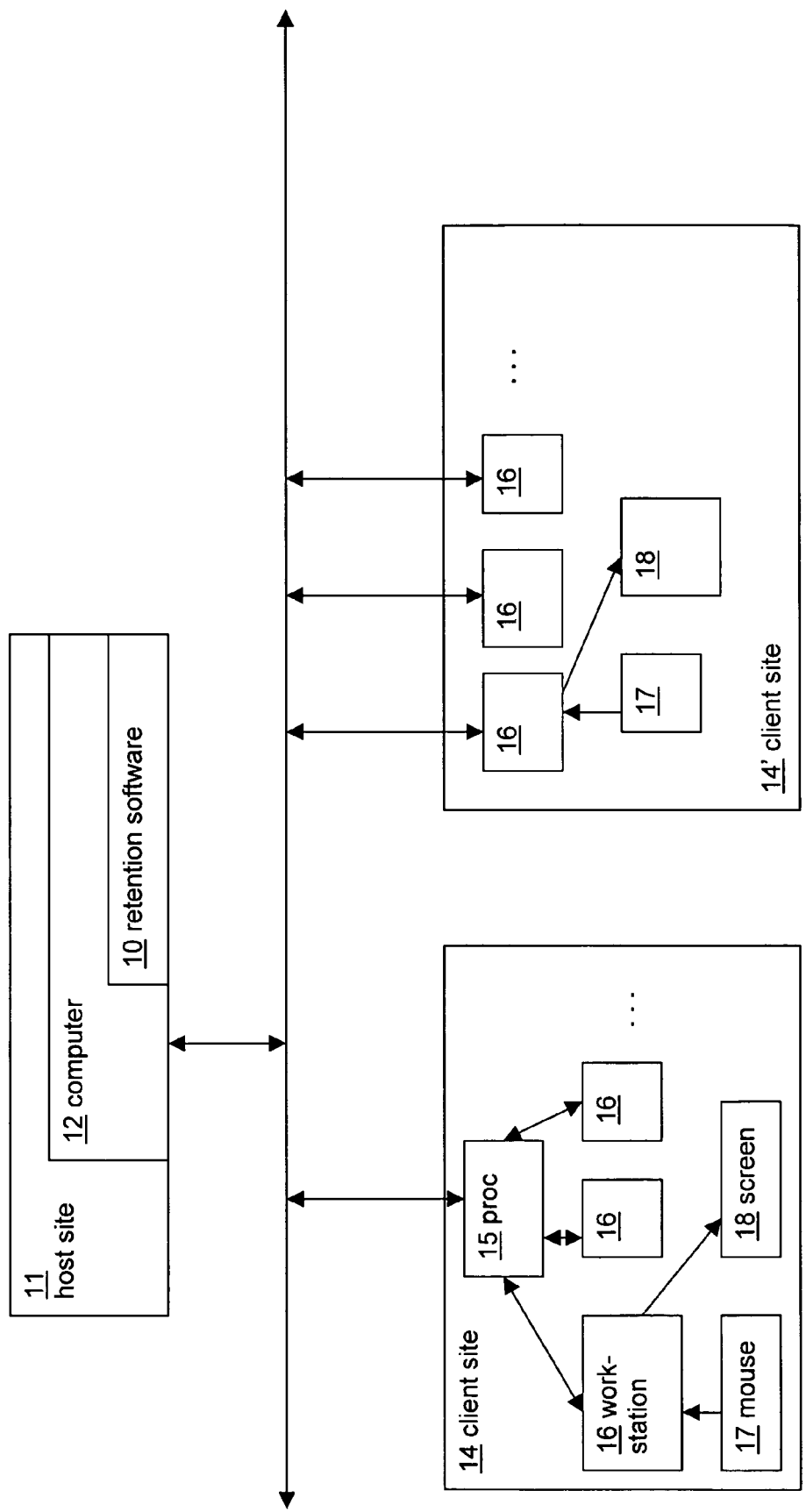
FIG. 1 is a schematic diagram of the system of the present invention.
Figure 2:
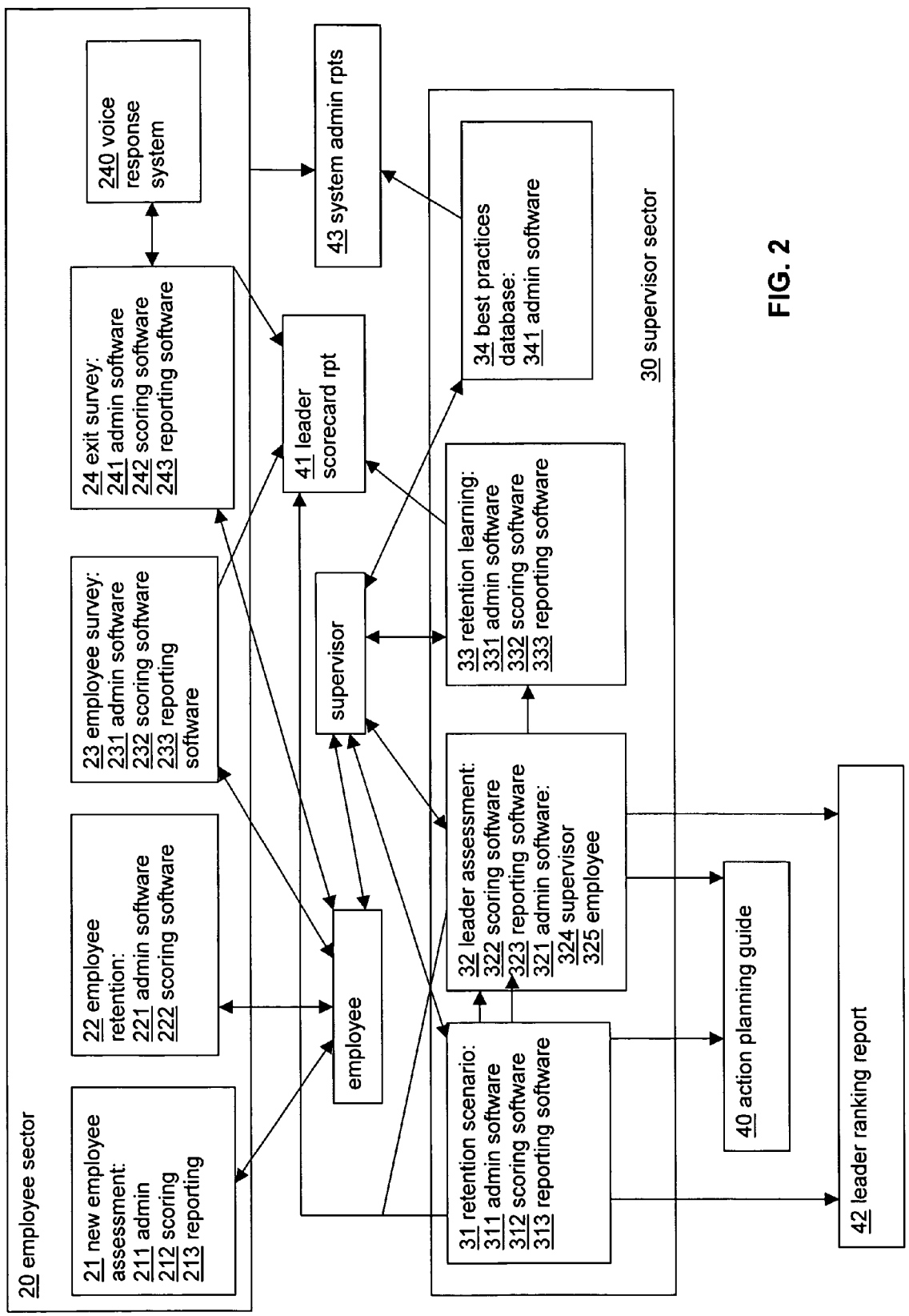
FIG. 2 is a schematic diagram of the module interactions.
Figure 4A:
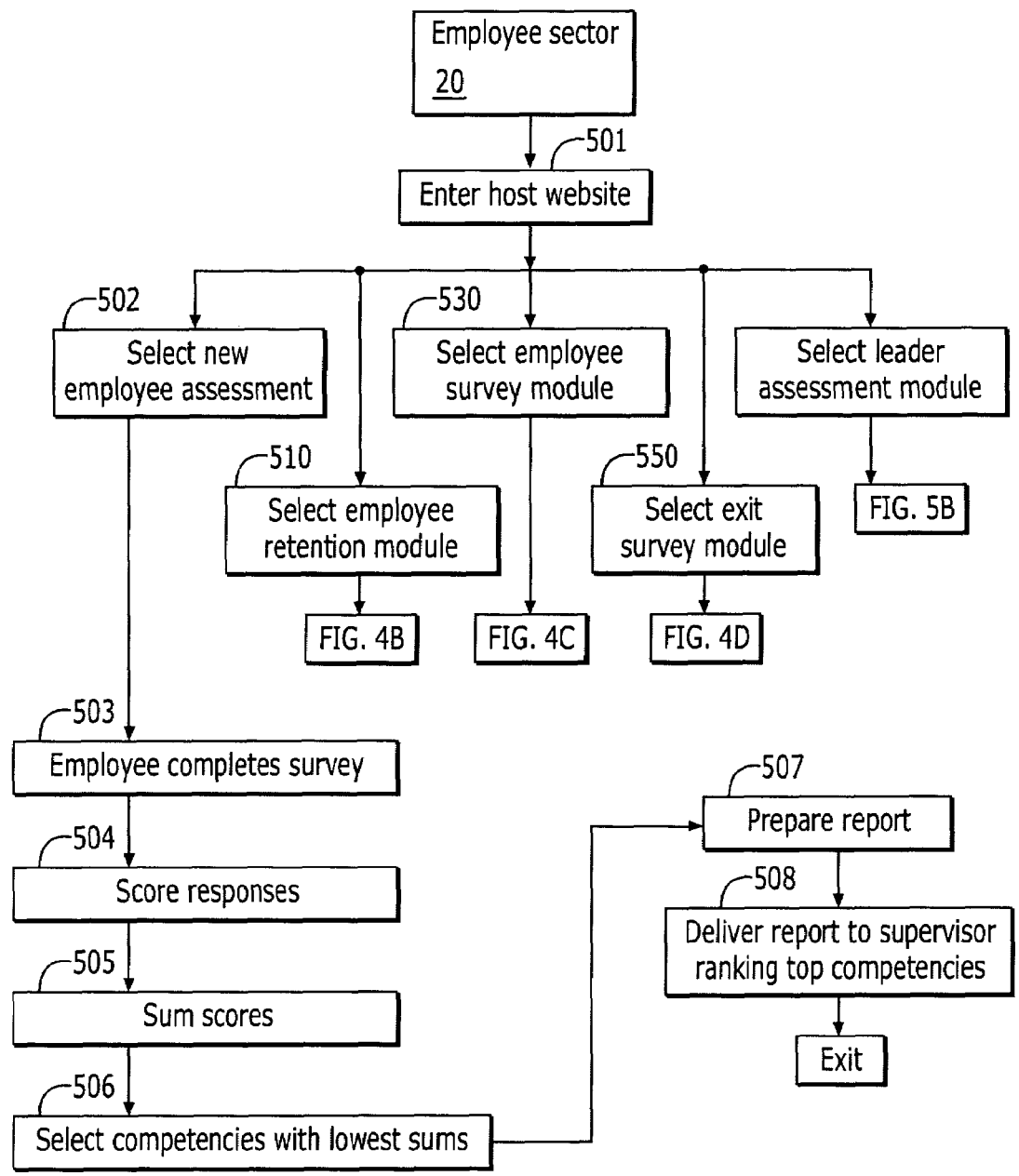
FIGS. 4A-4D is a flowchart of an exemplary pathway for practicing the employee sector of the invention.
Figure 4B:
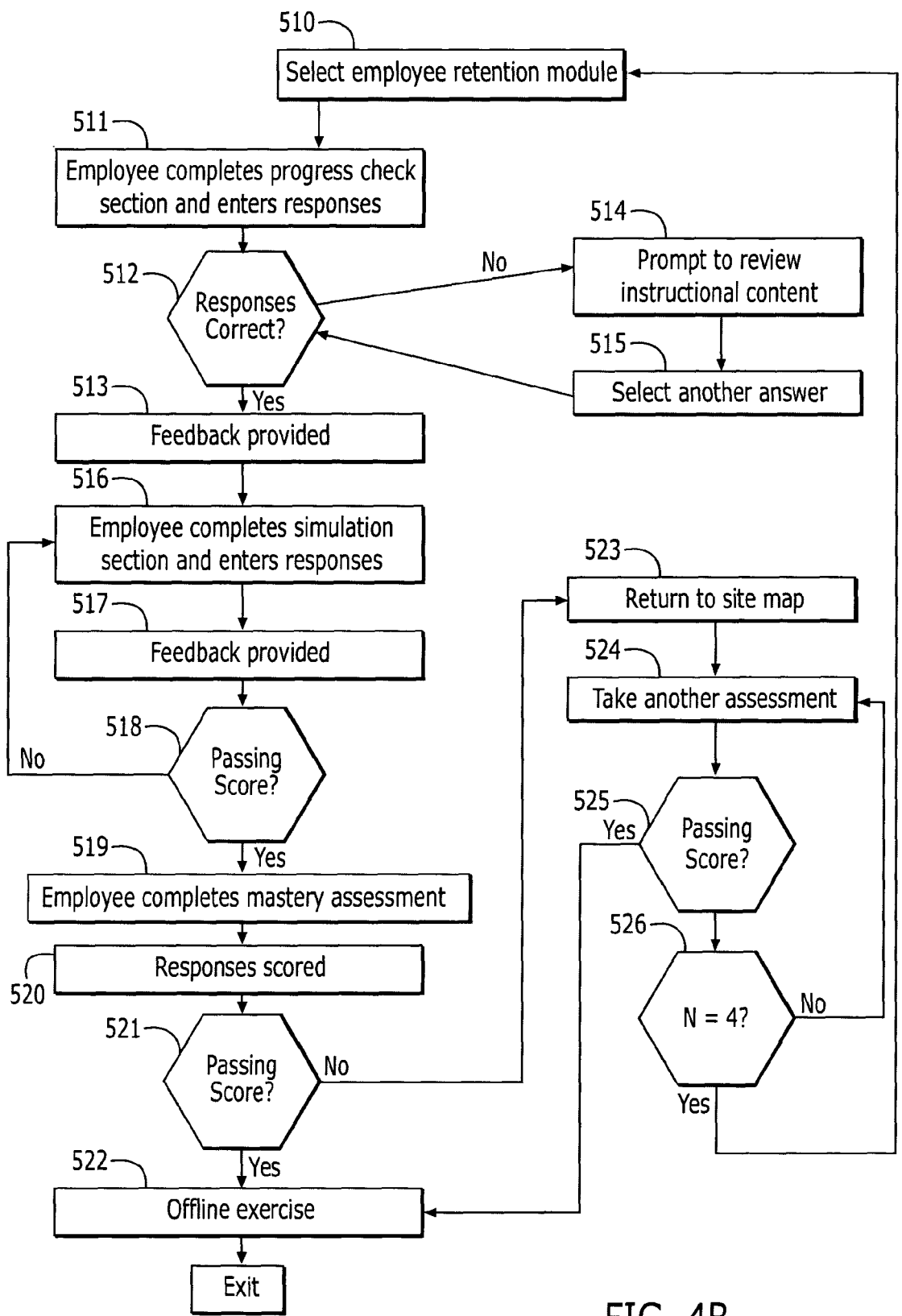
Figure 4C:
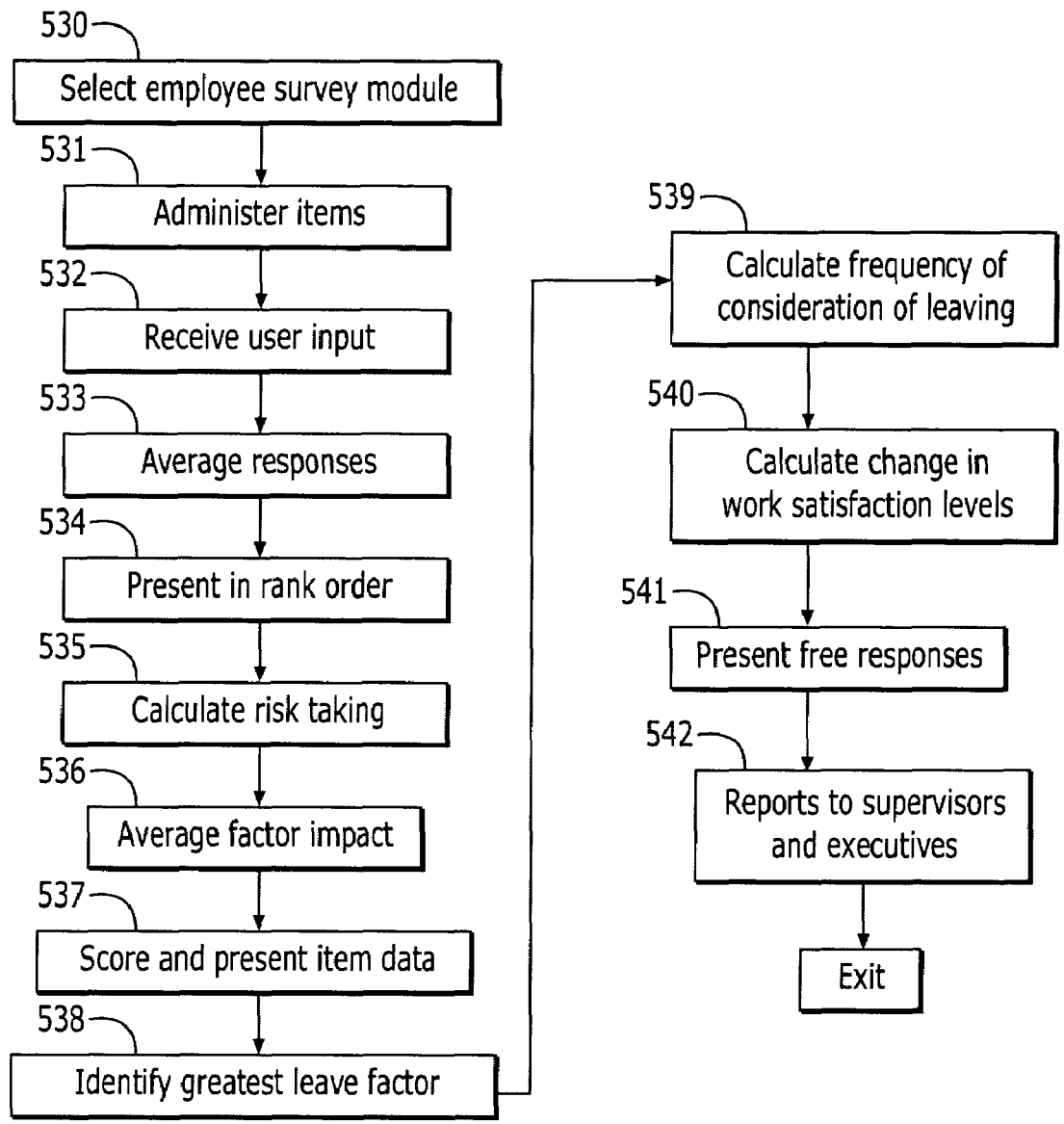
Figure 4D:
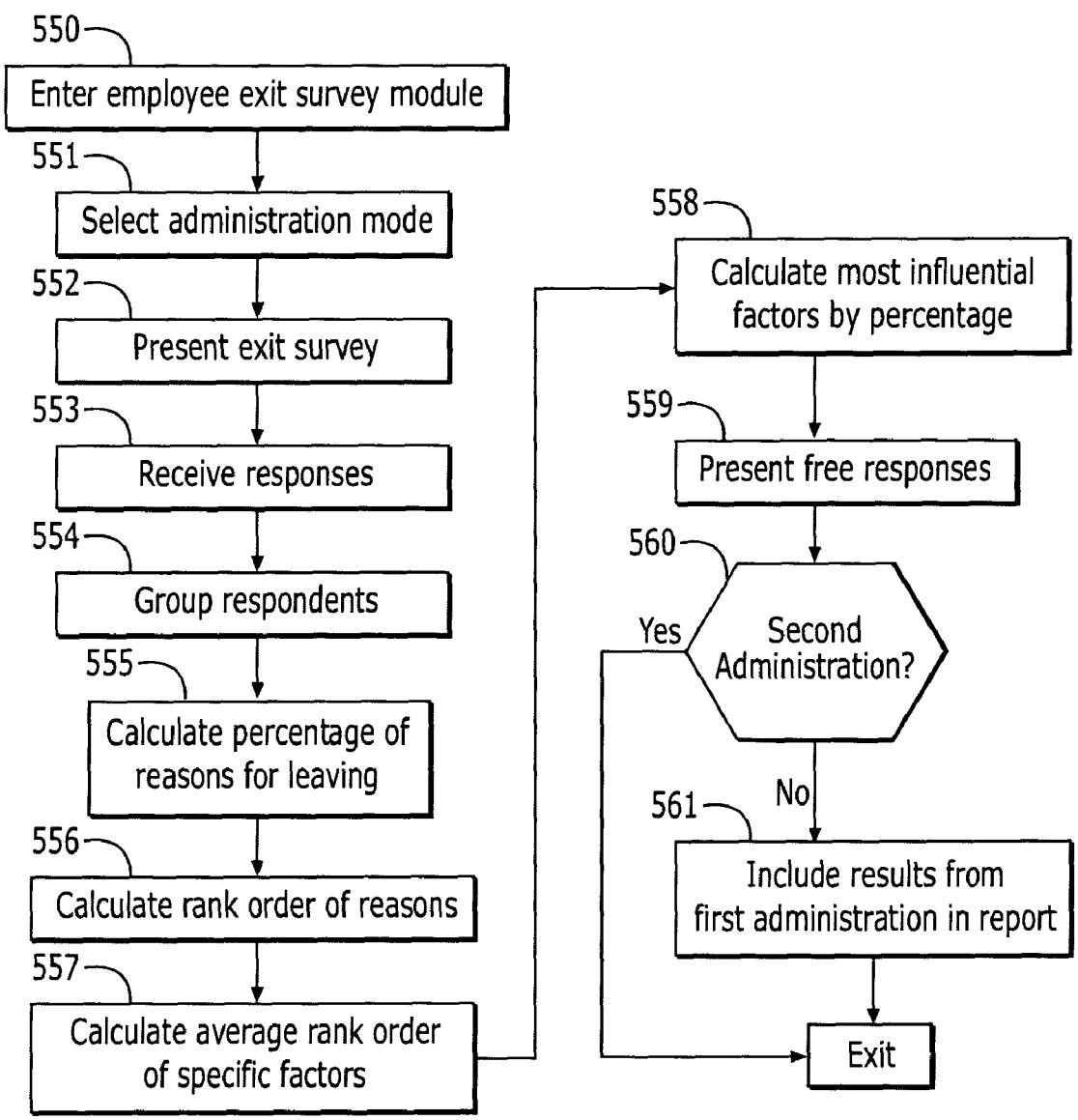

A description of the preferred embodiments of the present invention will now be presented with reference to FIGS. 1-5D.

The system 10 of the present invention (FIG. 1) in a preferred embodiment is resident upon a host-site 11 computer 12 and is accessible via a network such as the Internet 13, although this is not intended as a limitation, as an in-house system may also be contemplated by one of skill in the art. The system 10 is accessed from a client site 14, which may comprise, for example, a central server comprising at least one processor 15 and means for accessing the Internet 13, such as a DSL line or other connection such as known in the art. Alternatively, a client site 14' may lack a central server.

The client sites 14,14' also comprise a plurality of workstations 16, each comprising, for example, at least one input device such as a mouse 17 or other pointing device and an output device such as a screen 18. One of skill in the art will recognize that additional hardware options may be substituted or added, such as, but not intended to be limited to, a touch screen, a touch pad, a keyboard, or a printer. Each workstation 16 is in signal communication with the Internet 13, either directly as in client site 14' or via the processor 15 as in client site 14.

The software aspect of the system 10 (FIG. 2) includes a plurality of modules segregated among an employee sector 20 and a supervisor sector 30, as well as report generating functionalities. In general, the modules of the employee sector 20 are designed to elicit information productive of employee retention, both their own and that of their colleagues. The modules of the supervisor sector 30 are designed to assess the supervisor, integrate that assessment with data collected from the employee sector 20, and construct and deliver a recommended learning path for the supervisor for improving his or her leadership efficacy. In what is believed to represent the best mode of the present invention, ten leadership competencies are assessed and targeted for improvement as needed.

The ten leadership competencies in this embodiment comprise:

1. Talent finder
2. Trust builder
3. Communicator
4. Talent developer and coach
5. Esteem builder
6. Climate builder
7. Flexibility expert
8. High performance builder
9. Retention monitor
10. Retention expert The Employee Sector The employee sector 20 comprises in a preferred embodiment four modules 21-24 (FIGS. 4A-4D). A new employee assessment 21 (FIG. 4A), which comprises submodules for administration 211, scoring 212, and reporting 213, is completed by new employees to identify which of the ten leadership competencies they value in order. The results of the new employee assessment 21 are provided to that employee's supervisor in order to improve the likelihood of retaining that employee by adapting his or her style to the most important competencies identified.

The new employee assessment 21 is accessed by entering the host website (block 501), selecting the module 21 (block 502), and completing the survey presented (block 503). The assessment 21 is administered 211 by presenting three sets of the ten leadership behaviors, with each of the ten behaviors in each set representing one of the ten leadership competencies. The new employee is asked to rank in order each of the three sets from "1" to "10," with "1" representing the behavior he/she values most in a manager and "10" representing the behavior he/she values least in a manager.

The scoring software 212 assigns a value of "1" to "10" for each response within each of the three sets of leadership behaviors, based on the selections entered by the new employee (block 504). As each of the behaviors represents one of the ten competencies, the software 212 then adds together the values across the three sets of behaviors for each competency (block 505), resulting in a whole number between "3" and "30."

The scoring software 212 then selects the competencies having the lowest sums (block 506), these representing the three competencies valued most highly by the new employee. Any competency that ties among the top three is included; thus if two competencies having identical sums and tie for third lowest, four competencies are selected.

The reporting software 213 prepares a report (block 507) for delivery to the new employee's supervisor listing the three top competencies identified by the new employee (block 508). Behavioral examples for each of the listed competencies are included, and the supervisor is advised to consider these competencies when interacting with the new employee. If desired, the new employee can receive an analogous report.

An exemplary list of the ten retention competencies and associated behavioral components are as follows:

1. Talent finder: Within the confines of his/her job, exemplifies principles and practices of effective sourcing and selection.
 A. To the effect he/she formally plays a role in the process, is effective at sourcing and selection of job candidates.
 B. Considers job requirements, skills, talent, knowledges, training requirements, job-related experiences and work histories in making recommendations for hire.
 C. Supports the use of quick and efficient sourcing and selection tools.
 D. Gauges the applicant's job stability, i.e., propensity to leave.
 E. Places a premium on the applicant's fit with the organization's culture.
 F. Believes that effective sourcing and selection enhances employee retention.
 G. Given organizational constraints, reinforces employees for providing referrals.
 H. Provides applicants with realistic job previews, i.e., descriptions of the job and expectations, and information regarding opportunities for growth and advancement.
 I. Realizes that quick fixes—just filling openings somewhat independent of applicant quality—is detrimental to organizational and departmental success.

2. Trust Builder: Creates a sense of trust with employees.
 A. Is an effective trust builder.*
 B. Meets commitments.
 C. Asks employees what they need, what their goals are.
 D. Tells the truth.
 E. Doesn't misrepresent himself/herself for own gain.
 F. Takes responsibility for company policies; doesn't bad mouth company—avoids comments such as, "it is not my fault—it is the company's policy", "it is my manager's fault", etc.
 G. Doesn't compromise confidentiality.
 H. Doesn't blame.
 I. Apologizes, admits mistakes.
 J. Believes that trust enhances employee retention.
 K. Behaves in ways which are consistent with the fair, nondiscriminatory treatment of employees regardless of gender, race, disability, age.

3. Communicator: Practices two-way communication daily with employees by sharing and soliciting information to enhance employee retention.
 A. Effectively communicates regarding employee retention.*
 B. Communicates to employees the criticality of employee retention.
 C. Listens.
 D. Ensures two-way communication.
 E. Is approachable—e.g., open door policy, use of humor, etc.
 F. Solicits and values feedback from employees regarding his/her retention practices.
 G. Solicits and values feedback from team regarding work-related problems and acts accordingly.
 H. Believes that effective communication enhances employee retention.
 I. Communicates and celebrates wins of employees and team as a whole.

J. Recognizes and acknowledges tenure milestones, e.g., work anniversaries of employees.

K. Proactively shares information—industry trends, policy issues, developments within the organization and associated contingencies to keep employees in the "know" so as to stimulate their thinking and "engage" them in the "process."

4. Talent Developer And Coach: Develops and coaches employees to help them grow and deepen their commitment.

A. Is an effective talent developer and coach.*

B. Asks each employee about his/her growth needs and/or career aspirations and works with them to determine growth and career opportunities within the organization.

C. Creates employee developmental plans with each employee based in part on the employee's growth needs and desires.

D. Believes that developing and coaching talent of employees enhances employee retention.

E. Utilizes goals for coaching employee performance.

F. Provides frequent and meaningful feedback.

G. Encourages employees to stretch in terms of development.

H. Supports employees keeping up with technological developments.

I. Provides training and supports learning experiences for employees.

J. Supports qualified employees for promotions.

K. Supports employees who are content in their jobs and do not have other career aspirations.

5. Esteem Builder: Gives employees responsibility and freedom to act.

A. Empowers employees, i.e., gives them the authority to do things.*

B. Encourages employees to initiate employee retention-oriented behaviors, for example, listening and being supportive of fellow employees.

C. Creates an environment that motivates and reinforces employees to make decisions.

D. Believes that empowerment enhances employee retention.

E. Doesn't micromanage.

F. Shares ownership and visibility with employees.

G. Gives others credit when it is due.

H. Lets employees be responsible for their work.

I. Identifies and takes into account each employee's skills, abilities, and "hot buttons" in order to motivate them and reinforce their worth and accomplishments.

6. Climate Builder: Makes work and the workplace enjoyable and fulfilling.

A. Is effective at making work and the workplace a fun and stimulating place to be.

B. Creates an environment where employees want to come to work.

C. Observes when employees seem bored and creates ways to motivate them.

D. Periodically asks each employee if he/she is sufficiently challenged and responds accordingly.

E. Believes that a fun, stimulating, and challenging work environment enhances employee retention.

F. Provides as much choice as is possible regarding the way the work is actually done.

G. Allows employees to finish their work allowing for a sense of completion.

H. Encourages lightheartedness, where appropriate, to make the workplace more fun.

I. Creates achievable short-term goals to optimize sense of accomplishment.

7. Flexibility Expert: Recognizes and adapts to individual needs and views of employees.

A. Is effective at adapting to the needs and views of employees.

B. Where organizationally feasible, rotates job activities so as to stimulate interest.

C. Believes that flexibility enhances employee retention.

D. Encourages different views among employees.

E. Responds to special requests in times of employee need, e.g., family member's death.

F. Is cognizant of work-life balance concerns of employees and behaves accordingly.

G. Recognizes stress and overwork of employees and initiates action if possible to reduce stress.

H. Where possible, modifies physical environment, sequence of work activities, etc. to stimulate employees.

I. Recognizes and where appropriate, proactively responds to employee circumstances, for example, employee who has transportation problems.

8. High Performance Builder: Creates conditions that instill and reinforce high levels of employee performance.

A. Is an effective high performance builder, i.e., pushing employees to perform at high levels.

B. Conveys to employees that high performance benefits everybody, i.e., the employee, the team, the team manager, and the organization.

C. Does effective performance evaluations with employees.

D. Recognizes accomplishments and rewards appropriately.

E. Reinforces top performers.

F. Believes that encouraging high performance enhances employee retention.

G. Is able to separate below-par performance from the employee, thus preserving the employee's self-worth.

H. Makes employees feel valued.

I. When necessary, terminates unacceptable performers.

J. Demonstrates exemplary personal work behaviors.

K. Confronts difficult issues, e.g., performance problems, directly, but tactfully, and in a timely manner vs. avoiding or delaying.

9. Retention Monitor: Constantly monitors indicators of employee retention and takes appropriate actions.

A. Is effective at monitoring employee retention.

B. Believes that monitoring employee retention enhances employee retention.

C. Is on top of turnover statistics and costs of his/her team.

D. Is cognizant of employees who may be thinking of leaving and if desirable to keep them, proactively takes preemptive action.

E. Identifies top performers, develops and puts into practice a plan for retaining each of them.

F. Implements organization tactics and initiates own actions to enhance employee retention and meet team retention goals (assuming such goals exist).

G. Communicates team employee retention issues to superiors.

H. Makes his/her expectations clear to each employee regarding employee retention and encourages employees to discuss them.

I. Monitors employee retention practices of other local employers.

J. Monitors changes in employee work patterns as indicators of propensity to leave.

10. Retention Expert: Demonstrates the knowledge and conviction to initiate effective retention-focused behavior.
   A. Demonstrates high degree of knowledge and skills with respect to employee retention.
   B. Treats employee retention as a core value.
   C. Understands that employee retention impacts customer service and customer retention.
   D. Believes that he/she is a driver of employee retention.
   E. Knows the "3 c's"—the causes, costs, and consequences of turnover.
   F. Proactively and continuously seeks feedback, training, etc. to become an even better employee retention manager.
   G. Has non-work-related discussions with employees to demonstrate interest in them as people/individuals.
   H. Acts right instead of quickly.
   I. Creates with each employee a sense of belonging to a larger entity
   J. Discusses with employees how their work contributes to the organization's success such as how it relates to internal and external customers, and to the bottom line.

The employee sector 20 also comprises an employee retention module 22 (FIG. 4B) for employees, which converts employees into "retention agents." The retention module 22 presents information permitting the employee to consider the impact of someone leaving the organization and to explore solutions that might permit him or her to stay. This approach is believed successful, because co-workers are typically the first to learn of a colleague's intentions or desires to leave.

The employee retention module 22 comprises a plurality of presentation styles and types, including, for example, audio, graphics, learning segments and topics, progress checks, job simulations, and questions. A mastery assessment is presented at the module's conclusion, a review of key learning points is presented, and an off-line exercise is intended to put skills and information into practice.

The three learning styles are offered here as detailed above, the teaching route, the guiding route, and the accelerated route.

The administration software 221 receives a request from an employee to enter the employee retention module 22 (block 510) and presents an introduction. The employee completes the progress check section (block 511), and the scoring software 222 scores the responses (block 512) to progress check questions and provides immediate item-specific feedback (block 513), along with a rationale for the correctness or incorrectness of the response. If the response is incorrect, the software 222 prompts the user to review instructional content (block 514) and select other responses (block 515) until a correct answer is selected.

The employee completes the simulation section (block 516), and the scoring software 222 scores the responses to simulation questions and provides immediate item-specific feedback (block 517) with a rationale for the correctness or incorrectness of the response. At the conclusion of the simulation questions, the software 222 notifies the user of a passing score (block 518) if 80% of the simulation questions have been answered correctly. A passing score permits moving to the next section of the module 22; a non-passing score elicits a suggestion to repeat the simulation and re-take the questions.

The employee next completes the mastery assessment (block 519), and the scoring software 222 scores the responses to the mastery assessment (block 520) and notifies the user if a passing score (block 521) has been achieved with a score of ≧75%. A passing score permits moving to the off-line exercise; a non-passing score refers the user back to the site map (block 523), which highlights specific topics the user should review based upon the incorrect responses recorded. The software 222 then prompts the user to take a parallel version of the assessment (block 524), which presents different questions in random order in order to prevent the user from "learning the test" over repeated administrations. If a passing score (block 525) is not achieved after four attempts (block 526), the user is prompted to re-take the entire module 22.

No reports are generated in this module 22, but participation can be tracked on reports referenced in a "summary reports" section to be discussed in the following.

The employee sector 20 further comprises an employee survey module 23 (FIG. 4C), which measures a plurality of employee retention factors, including why employees join an organization, why they stay, why they would consider leaving, and how long they see themselves staying with the organization. Preferably all employees should be administered this module 23 at a predetermined interval. Repeat administrations of the employee survey module 23 provide the organization and its supervisors with comparison data for measuring changes in the organization and its employees. The data can be used to modify unproductive supervisory behavior and thereby improve retention. Additional benefits are provided by identifying specific retention factors that relate to the overall organization, as well as other issues such as compensation and schedules that may be amenable to adjustment.

The items in the employee survey module 23 examine a plurality of retention reasons based upon a list of potential reasons, the responses coded to represent whether the organization, job, or supervisor drives each item. Another item asks how long the employee sees him/herself staying with the organization; another asks how often he/she thinks about leaving the organization. In this embodiment, not intended as limiting, the items use a 5-point scale that varies depending upon the particular item. Free-response items are also included, one focusing on the one factor that would most influence the employee to stay with the organization, the second asking for the one factor that would most influence the employee to leave the organization. A final item asks if work satisfaction level has increased, decreased, or stayed the same over the past 6 months.

The employee survey module 23 comprises administration software 231 that receives a request from the user to enter the module 23 (block 530), administers the items (block 531), and receives user input (block 532).

Scoring software 232 averages all employee responses (block 533) to items that have a 5-point scale and presents the items in rank order (block 534), from highest to lowest on the same 5-point scale, including each item's average score. The software 232 also calculates an overall risk rating (block 535) based upon the distribution of responses to how long employees see themselves staying. The risk rating scale is a 5-point scale from very low to very high risk, and is based upon the number of employees who indicate their likelihood of leaving during the designated time periods.

The scoring software 232 also averages (block 536) the impact of job, organization, and supervisor factors on employees' being attracted to and staying with the organization. Each of these items is scored on a 5-point scale, and the software calculates and presents these data on the same scale (block 537). For those employees who have identified themselves as high-risk leavers based on those respective responses, the software 232 identifies the greatest leave factor among the employees' job, organization, and supervisor(s) (block 538).

The scoring software 232 additionally calculates the frequency that employees consider leaving the organization (block 539) on a 5-point scale that ranges from "never" to "always." The software 232 calculates numbers and percentages of employees who have responded to whether their work satisfaction levels have increased, decreased, or stayed the same in the previous 6 months (block 540). The software 232 also calculates the organization's satisfaction score on a 3-point scale, based on the percentage of employees whose work satisfaction levels have increased, stayed the same, or decreased.

Finally, the scoring software 232 organizes and presents employees' actual free responses (block 541) to the two items querying causes for staying and leaving.

The employee survey module 23 comprises reporting software 233 aimed at providing information to the organization to permit appropriate adjustments to be made to improve retention.

Regarding the employee's propensity to leave, supervisors, and executives of the organization, receive reports (block 542) that detail the following:

Overall risk rating for the organization on a 5-point scale based on the number distribution of responses to items that ask how long you see yourself staying with the organization. The risk rating scale is a 5-point scale, from very low to very high risk, and is based on the number of respondents who indicate their likelihood of leaving during designated time periods.

Respondents' percentage and number distribution based on same items.

Number of very high-risk respondents, based upon the number of responses on a 5-point scale that describes varying time periods when respondents see themselves leaving.

Highest risk factors for very high risk respondents ranking leader, organization, and job based on their order of influence.

A list of factors that most strongly influence respondents to leave the organization, presented from highest to lowest based on responses to a 5-point scale.

Frequency respondents consider leaving their job and organization, based on responses to a 5-point scale that ranges from "never" to "always."

Respondents' verbatim responses to one thing that would most likely cause them to leave the organization.

Regarding employee retention factors, supervisors receive reports that detail the following:

Influence of supervisor, organization, and job on retention on a 5-point scale which ranges from very strong influence to no influence.

Specific factors which influence employees to stay on the same 5-point scale; additionally those with ratings of 3 or higher are noted as reasons employees stay, whereas those with ratings below 3 are noted as reasons employees leave.

Employees' verbatim responses to one reason they stay with the organization.

Regarding teamwork satisfaction levels, supervisors receive reports that detail the following:

Employees' percentage and number distribution regarding whether work satisfaction levels have increased, decreased, or stayed the same during the past 6 months.

Organization score on a 3-point scale based on the same work satisfaction level responses, where a score below 2 indicates team satisfaction level has increased, a score of 2 indicates team satisfaction level has stayed the same, and a score above 2 indicates the team satisfaction level has decreased.

Regarding team attraction factors, supervisors receive reports that detail the following:

Influence of supervisor, organization, and job on attraction to work on a 5-point scale that ranges from very strong influence to no influence.

Factors that attracted employees, ranked by average on the same 5-point scale.

The employee sector 20 also comprises an employee exit survey module 24 (FIG. 4D) to determine true reasons for employees leaving their jobs (block 540). This module 24 may be administered either via the Internet 13 or by an interactive voice response system 240 (block 541). The supervisor requests all departing employees to complete this module 24 immediately, and the module 24 also asks these employees to participate in a second administration at a predetermined interval, for example, 30 days after the initial survey's completion.

In the present embodiment, the exit survey module 24 comprises more than 20 items, 8 multiple-choice questions using a 5-point scale and others requiring placing a plurality of choices in order. Free response questions are also provided.

The purpose of the exit survey module 24 is to help supervisors adjust behaviors that may be driving employees to leave, and also helps the organization hold supervisors accountable, as well as evaluate organizational and job factors that might be contributing to employees' leaving. Armed with the real reasons for employee departure, supervisors are motivated to make appropriate changes in order to improve retention.

The administration software 241 for this module, when accessed over the Internet 13, presents the exit survey (block 552). If the interactive voice response system 240 is selected, prompts are provided, and data are collected (block 553) via either the phone buttons or voice recognition software.

Scoring software 242 for this module 24 groups respondents (block 554) by organization and department, and then calculates the percentage (block 555) who have indicated each of the following:

Are staying or leaving the geographical location.

Have found another job, are planning to continue to work but have not yet found another job, or do not plan to work for 6 months or longer.

If they have found another job, whether it is in the same industry.

If they have found another job, whether it is the same type of job they are leaving.

Believe the organization could have done something to keep them from leaving.

Would consider re-joining the organization if the organization was willing to address the main reason they were leaving.

The software 242 calculates the rank order of reasons (block 556) that influenced employee decisions to leave the organization, based on a 5-point scale ranging from "very strong influence" to "no influence." Examples of reasons include "my supervisor/manager," "my co-workers," and "my current work schedule."

The software 242 also calculates the average rank order (block 557) of the following four specific factors' influence on employees' decision to leave, from most to least influence: job issues, manager, organizational issues, and personal issues. The software 242 also calculates the percent of employees who indicate which of the above-listed four factors was most influential in their decisions to leave (block 558). The software 242 further organizes and presents a list of employees' actual free responses (block 559) regarding the main reasons for leaving.

In a second survey administration (block 560), the software 242 calculates the same information listed above, and reports the responses from the second administration as well as those from the first administration (block 561).

Reporting software 243 for this module 24 assists supervisors to identify the true reasons for employee departure so that appropriate adjustments may be made. Additionally, the reports generated by the reporting software 243 help the organization hold supervisors accountable as well as helping in the adjustment of organizational factors that drive employees to leave.

The report from the first administration contains the following information:
- a Percentage of employees who are staying or leaving the geographic location.
- Percentage of employees who have found another job, are planning to continue to work but have not yet found another job, or are not going to work for at least the next 6 months.
- For those who are planning to continue to work but have not yet found another job, the percentage who plan to work in the same industry and in the same type of job.
- A list of 13 reasons that employees indicated influenced their decisions to leave their organizations, rank-ordered based on their responses on a 5-point scale from "very strong influence" to "no influence."
- A rank-order of the four factors' influence on employees' decisions to leave, such as job issues, manager, organizational issues, and personal issues.
- The percentage of employees who selected each of the above four factors as most influential on their decisions to leave.
- A verbatim list of employees' write-in responses regarding the main reason they were leaving their organization.
- The percentage of employees who believe their organization could have done something to keep them from leaving.
- The percentage of employees who would consider rejoining their organization if the organization was willing to address the main reason they left.

The report from the second administration contains the same information as the first administration, and also contains the first administration's results.

Although not listed in this employee sector 20, another module in which employees may participate is the leader assessment module 32, to be described below in the section on the supervisor sector 30.

The Supervisor Sector

The supervisor sector 30 (FIGS. 5A-5D) comprises in a preferred embodiment four modules 31-34. The first of these comprises a retention scenario module 31 (FIG. 5A; block 601) used by supervisors to measure their ability to recognize, understand, and apply behaviors that are effective in retaining talented employees. This module 31 provides a plurality of generic, real-life retention scenarios (block 602) followed by four responses, the supervisors asked to choose (block 603) the most effective and least effective choices for each scenario.

The scenarios, referred to also as "items," are based upon the above-listed ten leadership retention competencies. In this embodiment, each competency includes 9-11 specific behavioral components that are associated with doing that competency effectively. Some items measure more than one component.

Upon completing this module 31, each competency is scored (block 604) supervisors receive a supervisor retention competency report, which identifies their scores on each competency and an overall score, referred to as a "retention quotient" (block 605) The report also provides a customized developmental plan (block 606) that indicates the supervisor's performance in each competency and recommends specific competencies for development (block 607). The results from this module 31 and the next 32 are reported together (block 609) if both 31,32 are given (block 608); otherwise, these results are reported alone (block 610).

The administration software 311 of the retention scenario module 31 receives a request from a supervisor over the Internet 13 to initiate the module 31, and administers the module 13, and receives the results.

The scoring software 312 scales each item from best to least effective choice, and gives a score for each item based upon the extent to which the supervisor determines the best choice as well as the extent to which the supervisor determines the least effective choice. The scoring software 312 then computes a raw score for each competency by adding the scores for the items relating to each competency. The scoring software 312 then converts the raw scores for each competency to a score called a "competency performance indicator," which may comprise "excellent," "moderate," or "needs improvement."

Next the scoring software 312 calculates a separate overall score, averaging the scores for all competencies, the "retention quotient" (RQ) on a scale of 1 to 6, with 1 representing "needs improvement" and 6 representing "excellent."

The reporting software 313 generates the supervisor's retention competency report, which indicates in chart form each supervisor's competency performance indicator for each competency and each supervisor's overall RQ. An RQ score of 4 or higher is considered acceptable, and leaders achieving this score are not required to complete this module 31 again. Supervisors who score below 4 are recommended to repeat the module 31 every 6 months until they achieve a score of 4 or higher.

The competency performance indicator for each competency recommends which mode the supervisor should use when taking the related retention learning module 33, which, as will be described in the following, includes a set of submodules, one for each leadership retention competency. The "mode" refers to the above-described teaching, guided, and accelerated routes for taking the submodule.

If the following leader assessment module 32 is not used by an organization, the competency performance indicator for each competency derived from the retention scenario module 31 also recommends which four retention learning module 33 submodules the supervisor should take, determined by the four lowest competency scores.

The format of the report includes results on both assessments, the present module 31 and the leader assessment module 32. The retention scenario module 31 provides supervisors with an objective assessment of their ability to recognize, understand, and apply retention-related behaviors. The retention competency report provides supervisors with results for each competency, combined across two instruments on one graph, such as illustrated in FIG. 3.

In addition to these data, the report also includes definitions of the competencies and specific competency components as strengths or in need of development, as well as descriptions of alternate tools available for supervisor development that will be described in the following.

The ten retention competencies and associated behavioral components are as listed previously under the section on the new employee assessment module 21.

The leader assessment module 32 (FIG. 5B; block 620) is an Internet-based assessment that enables supervisors to compare ratings of their own on-the-job performances on the ten leadership retention competencies to the ratings of their performance by their manager, peers, and employees (block 621). Respondents are asked to respond to 100 items that are based on the components of the competencies that are listed under the section on the new employee assessment module 21, each item based upon one or more of the behavioral and belief components that define each individual retention competency. As can be seen, the number of components ranges from 9 to 11 for each competency. The response scale for each item is 1-6, with 1 representing "very strongly disagree" and 6 representing "very strongly agree." Respondents may also indicate "not applicable." The purpose of this module 32 is to provide supervisors with a true picture of how others view their performance as a "retention leader," and provides supervisors with an opportunity to compare their own ratings with ratings of others who have the opportunity to observe them on a daily basis at work.

When all respondents have completed this module 32 (block 622), the supervisor receives the supervisor competency report, which compares his/her self-assessment on each competency with the assessments of the supervisor's manager, peers, and employees. The report also directs supervisors to take four specific submodules of the retention learning module 33, which correspond to the four competencies rated as the lowest by the other respondents. Preferably the supervisors should complete this module 32. Supervisors should also re-take this module periodically, for example, every six months.

Administration software 321 forth is module 32 has a component 324 for supervisors and a component 325 for employees. The supervisor component 324 permits a selection of a manager, all employees, and four peers from the organization's database. These selected respondents are notified to complete the module 32 online, as does the supervisor. The employee component 325 administers the module 32 to those employees who have been notified to complete an assessment of a supervisor.

The scoring software 322 computes the score for each competency by averaging the ratings for each survey item that relates to that competency, for each rater (block 623). This results in separate scores for each competency for the supervisor him/herself, the manager, the peers as a group, and employees as a group.

The reporting software 323 generates the above-described supervisor's retention competency report (block 624), which provides the supervisor with a comparison of his/her self-rating on-the-job application of each individual retention competency with the ratings of his/her manager, peers, and employees. The ratings can be reported individually or grouped together as "others." The scores are presented on the same 1-6 scale as described above.

The reporting software 323 also provides for each supervisor specific elements observed to be strengths and specific elements observed to be in need of development (block 625). These elements are the specific behavioral components that define each of the ten leadership retention competencies.

The reporting software 323 also suggest four of the submodules from the retention learning module 33 based upon those indicated as being in greatest need of development by other respondents (block 626).

As described in the discussion of the preceding module 31, the reporting software 323 prepares a report including results from both modules 31,32, thereby providing a comparison of self-ratings with ratings by others as well as an objective assessment of their ability to recognize, understand, and apply retention-related behaviors (block 627). The report provides the supervisor with results for each competency, combined across two instruments on one graph.

The reporting software 323 includes definitions of the competencies and specific competency components to be strengths and in need of development, as well as reference to and descriptions of additional tools provided by the system 10 for assisting in leadership development.

The ten retention competencies and associated behavioral components are as listed previously under the section on the new employee assessment module 21.

The retention learning module 33 (FIG. 5C; block 630) comprises ten submodules and accompanying support tools for the ten leadership retention competencies listed above. Each competency comprises a plurality of specific behavioral components. As discussed above, supervisors are directed to specific submodules based upon the results in the retention competency report, which contains feedback based upon the supervisor's performance on the preceding two modules 31,32.

Each submodule contains two overall lessons (block 631) divided into several learning topics, each relating to a specific behavioral component of the given competency. At different points in the lessons, supervisors respond to questions, called "progress checks," to check their understanding of the topic (block 632). Once the progress checks for a lesson have been successfully completed (block 633), the supervisor is presented with a job simulation (block 636) that guides the supervisor through a real-life situation applying the concepts from the lesson. The simulations also include questions that require responses. Once job simulation questions have been completed, the supervisor is presented with a mastery assessment (block 639). After achieving a passing score on the mastery assessment (block 644), the supervisor is then able to view and print off-line learning activities, key learning points, and the glossary for the module. The supervisor's final step for each submodule is to complete the off-line learning activities that require the supervisor to apply the newly learned skills with his/her team and/or manager (block 646).

As previously, the supervisor can select the learning mode. The ten retention competencies and associated behavioral components are as listed previously under the section on the new employee assessment module 21.

The corresponding administration software 331 permits the user to log on and select the submodule in which to enroll and enter.

The scoring software 332 scores the responses to the progress check questions (block 632) and provides immediate item-specific feedback (block 634) with a rationale as to why the response is correct or incorrect. If the response is incorrect, the software 332 prompts the supervisor to review the instructional content (block 635). The supervisor can continue to select other responses to incorrectly answered items until he/she selects the correct response.

The scoring software 332 scores the responses to simulation questions (block 637) and provides immediate item-specific feedback with a rationale as to why the response is correct or incorrect. At the conclusion of the simulation questions, the software 332 notifies the supervisor if he/she has achieved a passing score (block 638) to the simulation question section by answering 80% of the questions correctly. If he/she achieves a passing score, the next section of the module 33 is presented (block 639); if he/she fails to achieve a passing score (block 638), he/she is advised to repeat the simulation (block 636) and re-take the questions.

The scoring software 332 scores the responses to the mastery assessment (block 640) and notifies the supervisor if he/she achieves a passing score by answering 75% of the questions correctly. If a passing score is achieved (block 641), the off-line exercises are initiated (block 646); if not, the software 332 refers back to the site map (block 642), which highlights specific topics the supervisor should review based upon the incorrect responses. The software 332 then prompts the supervisor to take a parallel version of the assessment (block 643). This version presents different questions in random order in order to prevent the supervisor from "learning the test" over a series of administrations. If a passing score (block 644) is not achieved after four attempts (block 645), the software 332 prompts the supervisor to re-take the respective submodule (block 630).

The reporting software 333 occurs electronically in a preferred embodiment, with no specific reports generated. Participation can be tracked in a summary report to be described below.

Figure 5A:
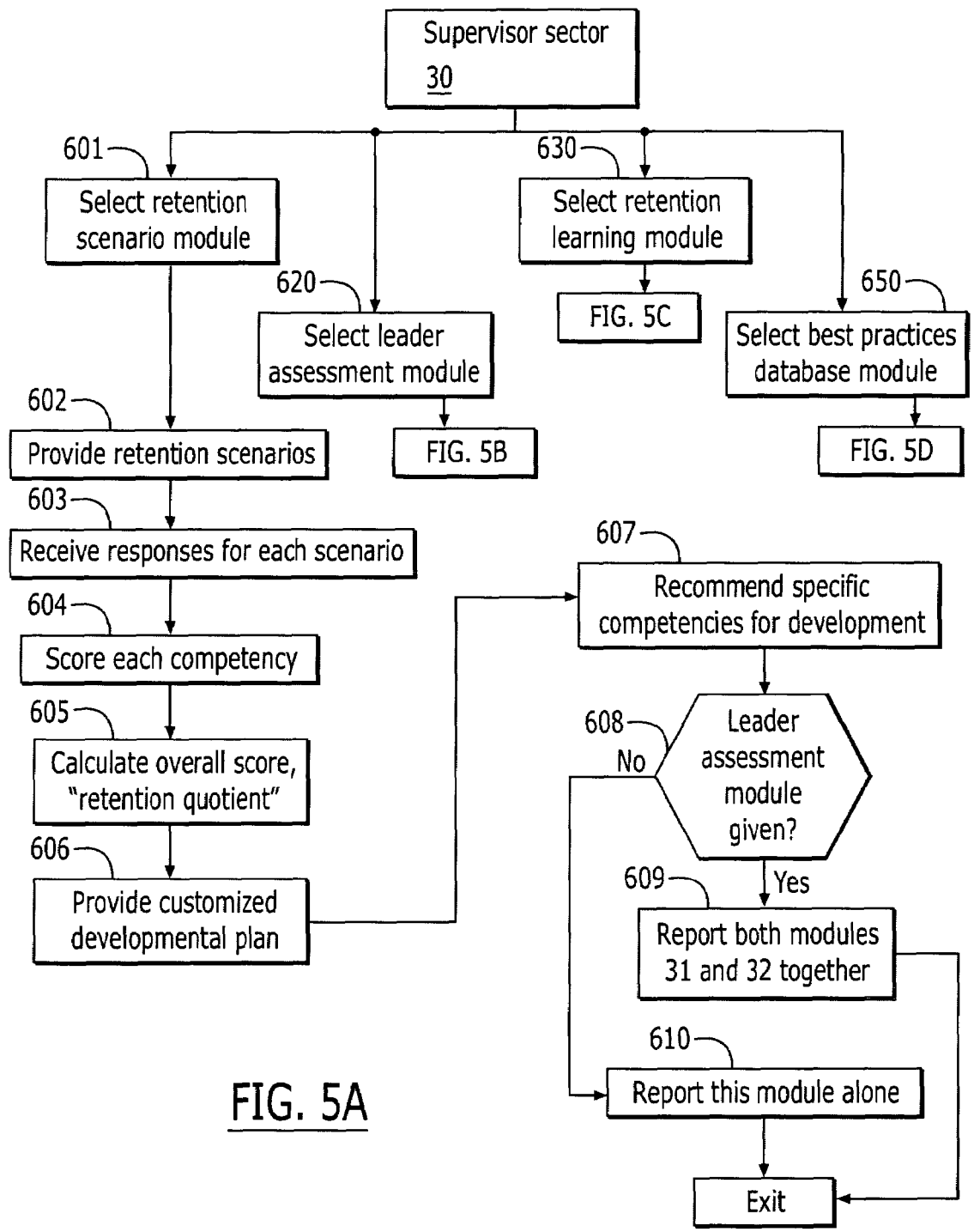
FIGS. 5A-5D is a flowchart of an exemplary pathway for practicing the supervisor sector of the invention.
Figure 5B:
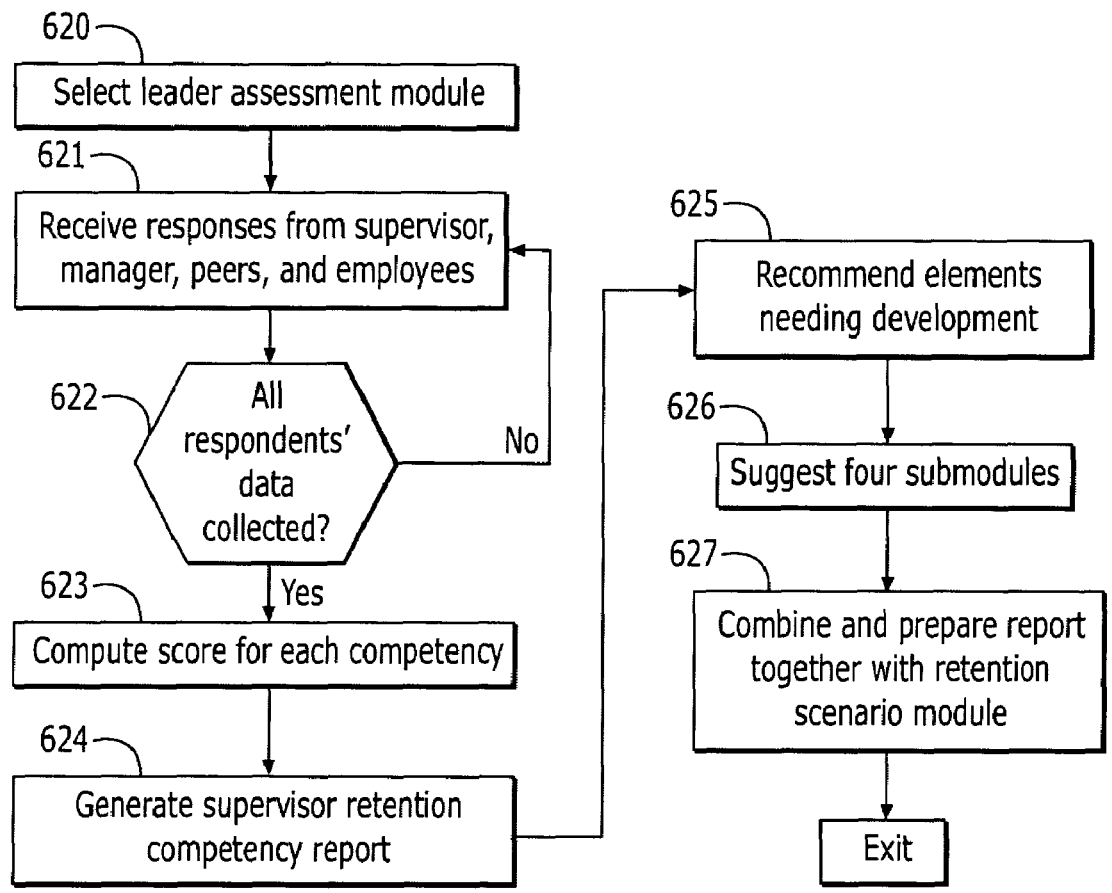
Figure 5C:
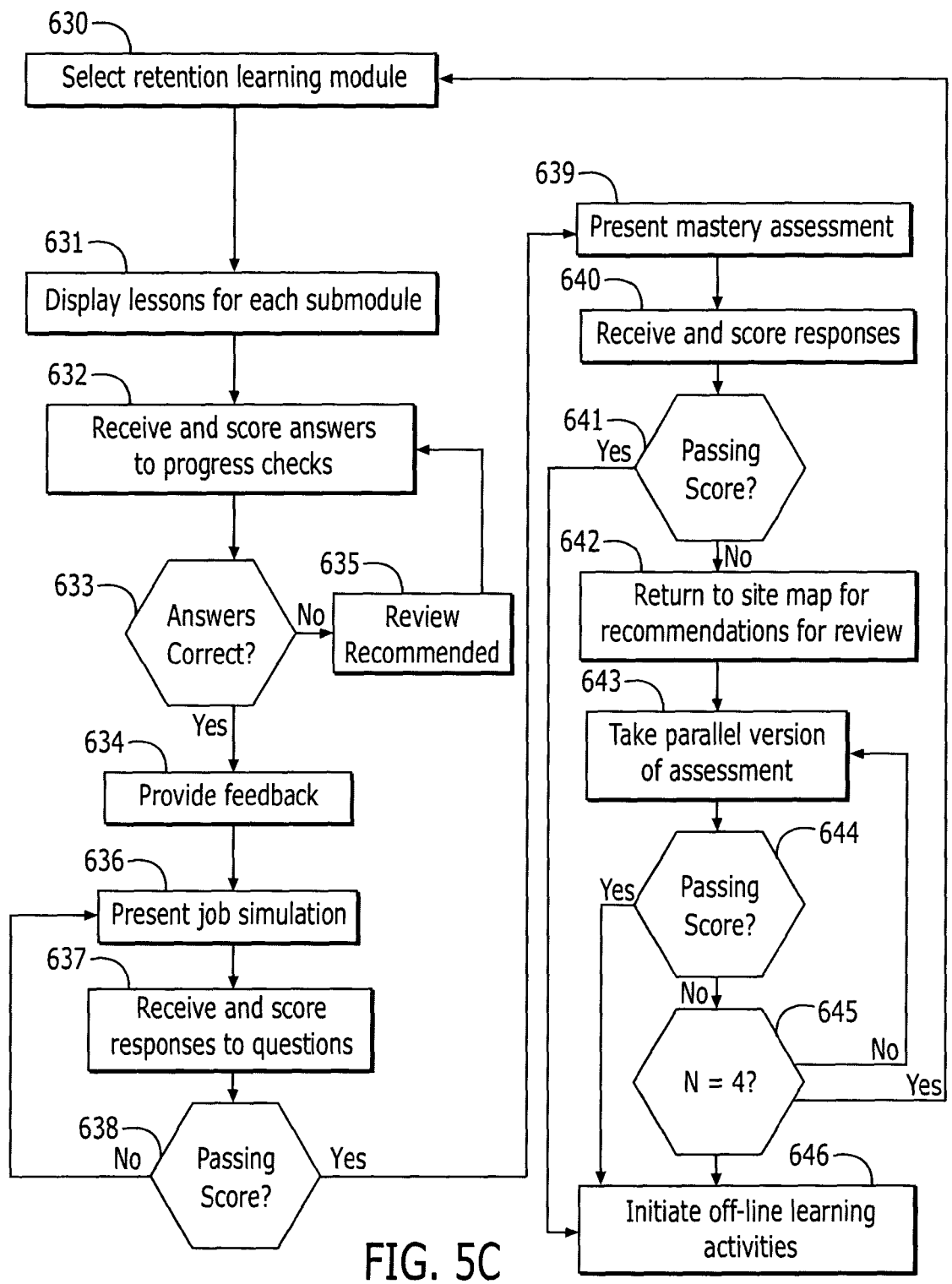
Figure 5D:
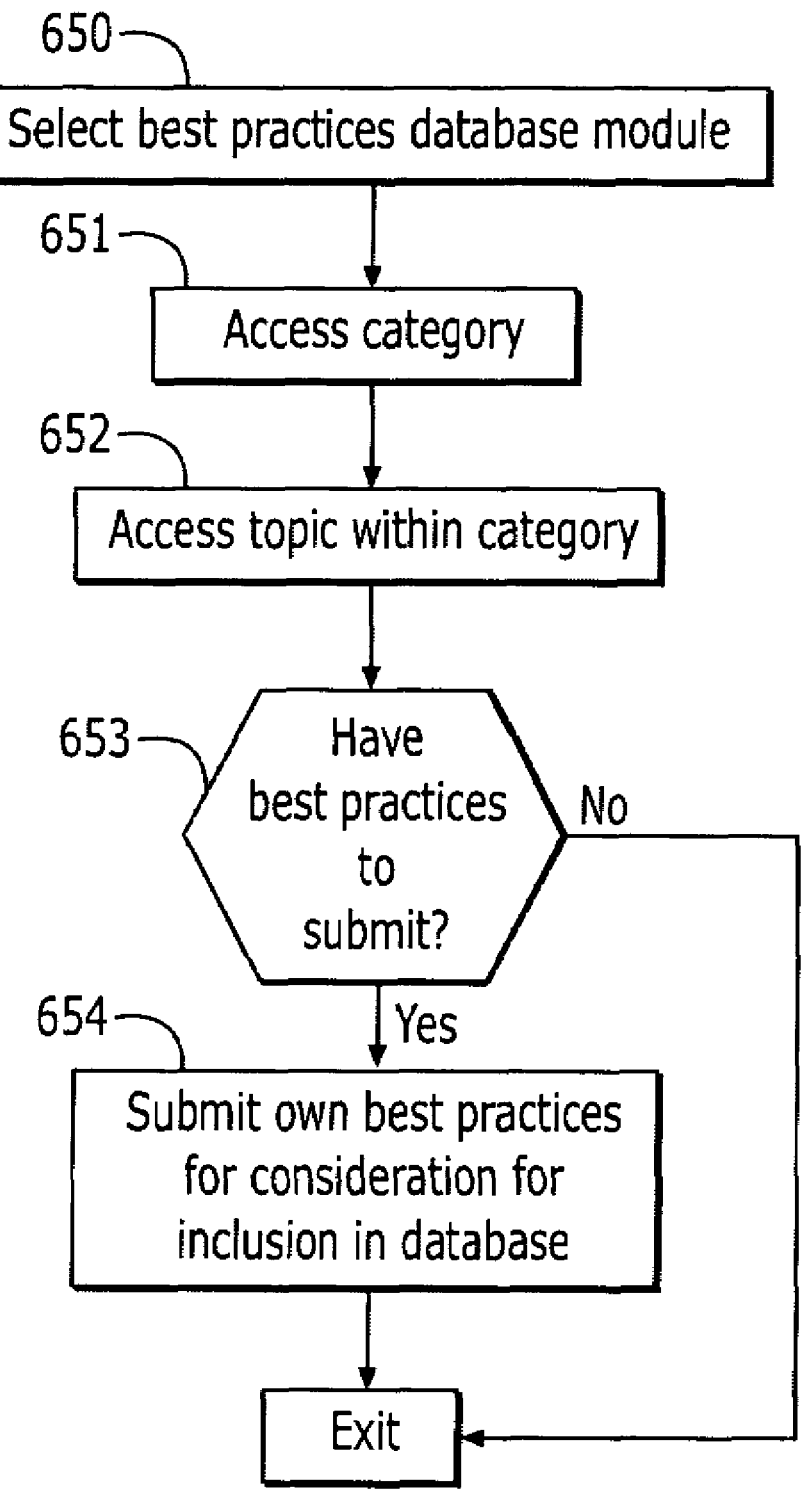

A final module in the supervisor sector 30 comprises a module 34 leading to a web-based database of employee retention best practices that is accessible by supervisors to find solutions to retention issues (FIG. 5D; block 650). These best practices have been collected and supplemented from client supervisors' experience, and are expected to grow over time with continuing experience with the present invention. At present categories comprise: finding talent; selecting talent; coaching and developing a team; communicating to win; combating controllable and uncontrollable turnover; managing pay, benefits, and rewards; addressing poor performance; managing and overcoming resignations; and retaining winning employees.

The best practices database module 34 includes administration software 341 for presenting a menu of choices to the user for accessing a category (block 651), and then accessing a topic within that category (block 652). The supervisor can also, if desired (block 653), submit his/her own suggested best practices to be considered for inclusion in the database module 34 (block 654).

The Reporting Functionalities

The reporting functionalities include those described above with respect to the respective modules. Additional reports include a leader development action planning guide 40, a leader's scorecard report 41, a leader ranking report 42, and system administration reports 43. The development action planning guide 40 assists supervisors record key performance measures and set targets for future performance. Equipped with the wide range of feedback from the retention scenario module 31 and the leader assessment module 32, supervisors have an opportunity to develop an improvement action plan, build, and practice skills, and look forward to next-round feedback to ensure they have achieved their targets. In a preferred embodiment the guide 40 is available on-line, facilitating completion. After entering their current performance data and setting performance targets, supervisors are instructed to meet with their managers for input on the targets, and then meet with employees to disclose the four competency areas the supervisor has identified for development as well as seek additional feedback.

The guide 40 includes the following measurement categories with current data input spaces for future targets. From the retention competency report: overall RQ score, leader assessment module ratings from employees for all ten competencies, and completion dates for the four recommended submodules, as well as any of the other submodules selected by the supervisor; from a talent watch group report: employee propensity to leave overall risk rating, leader effectiveness rating, employee work satisfaction level, and actions supervisors will take to reinforce the top three reasons employees have indicated they stay, as well as to list actions they will take to overcome the top three reasons employees have indicated would cause them to leave; from the exit survey report: rank-order of factors that influence employees to leave (selected from organization, job, and supervisor, preferably in this order) and actions they will take to overcome the top three reasons employees report as main reasons they left, as well as three ideas for re-recruiting talented employees who have left.

The leader's scorecard report 41 is a summary report for supervisors that records their progress on a number of the modules. The scorecard report 41 is available on-line in a preferred embodiment and is accessible at any time, including the following data: From the retention competency report: most recent overall RQ score, with a score of 4 or higher being acceptable, most recent leader assessment module results with an overall rating and scores for each competency for self, manager, peers, and employees, submodule progress for those that were recommended as well as others that have been completed; from a talent watch group report: employee propensity to leave overall risk rating, number of high-risk employees, highest risk factors for each very high-risk employee from three factors (organization, job, and supervisor issues), and percent and distribution of responses regarding how long employees see themselves staying with the organization, based on a 5-point scale of durations, team attraction and retention factors measuring the influence of organization, job, and supervisor on a 5-point scale, and employee work satisfaction level on a 3-point scale; from the exit survey report: rank-order of most- to least-influential factors that influence employees to leave (selected from organization, job, supervisor, and personal), percent of employees who ranked organization, job, manager, and personal as most influential in their leave decisions, and percentage who responded yes, no, or unsure to whether the organization could have done something to keep them from leaving, and also whether they would consider re-joining the organization if the organization was willing to address their main reason for leaving.

The leader ranking report 42 includes data from the retention competency report, ranking supervisors from best to worst on their average employee leader assessment module 32 rating. This rating is valued highest because the focus of the retention efforts is the employee. For supervisors having identical scores, ties are broken by their overall RQ scores, and then alphabetically.

Specific data in the leader ranking report 42 include: leader assessment module 32 ratings for each competency by self, manager, peers, and employees; overall average leader assessment module ratings by self, manager, peers, and employees; and overall RQ score from the retention scenario module 31.

The system administration reports 43 provide executives with the opportunity to track both participation levels and results for the organization, individual departments, and other workforce segments. For example, executives can identify the number of employees across the organization who have completed any of the modules or other results from other departments.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system and methods illustrated and described herein are by way of example, and the scope of the invention is not limited to the exact details thereof.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method of reducing employee turnover comprising the steps of:
    accumulating data from an employee on a plurality of aspects of supervisor performance by delivering a data collection module to the employee on a computer, wherein the data collection module comprises an employee retention module comprising means for training the employee in assisting in employee turnover reduction among co-workers;
    processing the accumulated data to rank the plurality of aspects of supervisor performance;
    determining an appropriate training module for improving a lowest-ranked aspect;
    delivering the training module to the supervisor;
    after the supervisor has completed the training module, assessing the supervisor in the lowest-ranked aspect;
    if the assessing step determines that the supervisor is still deficient in the lowest-ranked aspect, redelivering the training module to the supervisor; and
    if the assessing step determines that the supervisor is no longer deficient in the lowest-ranked aspect, recommending at least one exercise to the supervisor to be performed with an employee for enhancing trust therebetween.

2. The method recited in claim 1, further comprising the steps of:
    administering a new employee assessment module to a new employee, the new employee assessment module comprising means for assessing an importance of a plurality of aspects of supervisor performance;
    receiving and analyzing answers from the assessing means from the new employee; and
    providing a report to the supervisor regarding the importance of the supervisor performance aspects for improving a likelihood of retaining the new employee.

3. The method recited in claim 2, wherein the performance aspects comprise a set of leadership retention competencies, the analyzing step comprises ranking the set of leadership retention competencies by importance to the new employee, and the report includes the leadership retention competencies ranked to be most important.

4. The method recited in claim 1, wherein the data collection module is delivered over a network from a central site.

5. The method recited in claim 1, wherein the data collection module delivering step comprises the step of administering an employee survey module comprising means for assessing a plurality of employee retention factors.

6. The method recited in claim 5, wherein the employee survey module administering step is repeated at a predetermined interval for measuring changes in the employee retention factors.

7. The method recited in claim 5, wherein the assessing means comprises means for providing a measure of risk of employee turnover to the supervisor.

8. The method recited in claim 1, wherein the data collection module delivering step comprises the step of administering an employee exit survey module to a departing employee comprising means for assessing a reason for the employee resignation.

9. The method recited in claim 8, further comprising the step of administering the employee exit survey module a second time to the employee to whom the employee exit survey module had previously been administered.

10. The method recited in claim 1, wherein the training module delivering step comprises presenting a plurality of lessons, each lesson comprising a plurality of learning topics and a plurality of questions for delivery to the supervisor, the questions spaced throughout the lesson for assessing topic understanding, and receiving answers to the questions from the supervisor.

11. The method recited in claim 10, wherein the each lesson comprises computer-delivered instruction having text, audio, and graphic components.

12. The method recited in claim 10, further comprising the steps, following the answers receiving step, of:
    comparing each answer with a correct response;
    providing feedback to the supervisor on the response prior to continuing with the lesson presenting step, the feedback comprising a rationale for the correctness or incorrectness of the answer; and
    if an answer is incorrect, providing a prompt to the supervisor to review associated instructional content.

13. The method recited in claim 1, wherein the training module delivering step comprises the steps of presenting a summary of a learning topic related to the lowest-ranked aspect of performance and a plurality of questions on the learning topic, and receiving answers to the questions from the supervisor.

14. The method recited in claim 1, wherein the training module delivering step comprises the steps of presenting a plurality of questions on a learning topic related to the lowest-ranked aspect of performance, and receiving answers to the questions from the supervisor.

15. The method recited in claim 1, further comprising the steps of:
    delivering a retention scenario module to the supervisor, the retention scenario module comprising a plurality of scenarios, each scenario followed by a plurality of choices comprising behavioral methods of reacting to the scenario, and means for receiving a selection from among the choices from the supervisor;
    scoring the supervisor selections;
    reporting results of the scoring step to the supervisor; and
    providing a recommendation for a training module to be taken by the supervisor.

16. The method recited in claim 15, wherein the recommendation providing step further comprises a recommendation of a mode for taking the recommended training module, the mode selected from an instructional mode, a summary mode, and a progress checking mode.

17. The method recited in claim 15, wherein:
- each scenario and associated choices are adapted to assess supervisor competency in one of a set of leadership retention competencies;
- the scoring step comprises ranking the supervisor competency in each of the leadership retention competencies; and
- the recommendation providing step comprises recommending a plurality of training modules associated with the leadership retention competencies in which the supervisor ranked lowest.

18. The method recited in claim 17, further comprising the step, following the training module recommending step, of recommending that the supervisor repeat the retention scenario module at a predetermined interval.

19. The method recited in claim 1, further comprising the steps of:
- collecting data from a second supervisor on a plurality of aspects of the supervisor performance;
- collecting data from a manager above the supervisor on the plurality of aspects of the supervisor performance;
- collecting data from the supervisor on the plurality of aspects of the supervisor performance;
- collecting data from an employee on the plurality of aspects of the supervisor performance; and
- presenting the collected data from the second supervisor, the manager, the employee, and the supervisor to the supervisor for permitting a comparison of self-analysis with analyses by the second supervisor, the manager, and the employee.

20. The method recited in claim 19, further comprising the step of determining and recommending an appropriate training module to the supervisor based upon the presented collected data.

21. The method recited in claim 1, further comprising the step, between the training module delivery step and the assessing step, of presenting a job simulation to the supervisor, the job simulation including a situation related to the lowest-ranked aspect of performance.

22. The method recited in claim 21, wherein the job simulation presenting step comprises presenting a plurality of questions to the supervisor relating to the simulation and receiving answers to the questions from the supervisor.

23. The method recited in claim 22, further comprising the steps of scoring the received answers and, if a predetermined score is not achieved, recommending that the job simulation be taken again.

24. The method recited in claim 1, further comprising the step, following the review module delivering step, of offering an additional learning activity to the supervisor related to the lowest-ranked aspect.

25. The method recited in claim 24, wherein the learning activity offering step comprises the step of providing continuing support and information from a best practices database accessible over a network.

26. The method recited in claim 25, further comprising the step of permitting the supervisor to enter information for inclusion in the best practices database.

27. The method recited in claim 1, further comprising the steps of:
- calculating a score based upon the assessing step; and
- issuing a report including the score to the supervisor and to a predetermined retention competency leader.

28. The method recited in claim 27, wherein the supervisor comprises a plurality of supervisors, and wherein the issued report further includes a rank of the supervisors based upon the scores.

29. The method recited in claim 1, wherein the plurality of aspects of supervisor performance are selected from among a set of leadership retention competencies targeted for reducing employee turnover.

30. The method recited in claim 29, wherein the leadership retention competency set comprises finding talent, building trust, communicating, developing and coaching talent, building esteem, building a desired work climate, having flexibility, building performance, monitoring retention, and initiating retention-focused behavior.

31. A computer-readable medium having stored thereon computer software installable on a processor for interacting with an employee and a supervisor for reducing employee turnover, the computer software comprising:
- a module for accumulating data from an employee on a plurality of aspects of supervisor performance;
- a module for processing the accumulated data to rank the plurality of aspects of supervisor performance;
- a module for determining an appropriate training module for improving a lowest-ranked aspect;
- a module for retrieving the training module from a database and for delivering the training module to the supervisor;
- a module for, after the supervisor has completed the training module, assessing the supervisor in the lowest-ranked aspect;
- a module for, if the assessing step determines that the supervisor is still deficient in the lowest-ranked aspect, retrieving the training module from the database and redelivering the training module to the supervisor; and
- a module for, if the assessing step determines that the supervisor is no longer deficient in the lowest-ranked aspect, recommending at least one exercise to the supervisor to be performed with an employee with an intention to enhance trust therebetween.

32. A system for interacting with an employee and a supervisor for reducing employee turnover comprising:
- an employee computer comprising a processor, a display device, and an input device;
- a supervisor computer comprising a processor, a display device, and an input device;
- a server in signal communication with the employee computer and the supervisor computer;
- a software module accessible by the employee computer for accumulating data from an employee via the input device on a plurality of aspects of supervisor performance by delivering a data collection module to the employee computer, the data collection module comprising an employee retention module comprising means for training the employee in assisting in employee turnover reduction among co-workers;
- a software module installable on the server for receiving the accumulated data from the employee computer and for processing the accumulated data to rank the aspects of supervisor performance;
- a software module installable on the server for determining an appropriate training module for improving a lowest-ranked aspect;
- a software module installable on the server for retrieving the training module from a database and for delivering the training module to the supervisor computer for interaction with the supervisor;
- a software module accessible by the supervisor computer for, after the supervisor has completed the training module, delivering an assessment to the supervisor in the lowest-ranked aspect;

a software module installable on the server for receiving and processing assessment results from the supervisor computer;

a software module for, if the processing of the results indicates that the supervisor is still deficient in the lowest-ranked aspect, retrieving the training module from the database and redelivering the training module to the supervisor computer for interaction with the supervisor; and a software module for, if the processing of the results indicates that the supervisor is no longer deficient in the lowest-ranked aspect, recommending at least one exercise to the supervisor to be performed with an employee for enhancing trust therebetween.

33. The system recited in claim 32, wherein the server is located at a supervisor and employee site.

34. The system recited in claim 32, wherein the supervisor computer and the employee computer are located at a supervisor and employee site and the server is located at a remote site accessible via a network.

* * * * *